United States Patent Office 3,022,177
Patented Feb. 20, 1962

3,022,177
HALOGENOPLATINOUS MERCAPTIDE-ALKYL
SULFIDE COMPLEXES
Howard M. Fitch, Summit, N.J., assignor, by mesne assignments, to Engelhard Industries, Inc., Newark, N.J., a corporation of Delaware
No Drawing. Filed Jan. 25, 1960, Ser. No. 4,212
58 Claims. (Cl. 106—1)

This invention relates to novel halogenoplatinous mercaptide-alkyl sulfide complexes and to new and improved decorating compositions containing such complexes.

The complexes of the invention have a mercapto group directly bonded through the mercapto sulfur atom to a platinous monohalide forming a halogenoplatinous mercaptide to which a molecule of an alkyl sulfide is attached by coordinate linkages. They have the general formula RSPtX·Y, wherein X is halogen, R is an alkyl, substituted alkyl, aralkyl or terpenyl radical, Y is an alkyl sulfide, a substituted alkyl sulfide or a heterocyclic sulfide containing a —$CH_2SCH_2$— linkage in the ring, and wherein R and Y combined contain at least 7 carbon atoms.

The complexes of the invention may be prepared by admixing a platinous halide, preferably a platinous chloride, a mercaptan and an alkyl sulfide. Although equimolar proportions of the reactants may be employed, it is usually preferable to use an excess of the order of 5 to 10 percent of the mercaptan and of the order of 10 to 20 percent or greater of the alkyl sulfide to assure maximum utilization of the platinum. It is preferable to use an aqueous solution of the platinous halide in the form of a salt with an ammonium, sodium or potassium halide. Suitable salts include potassium platinous chloride, ammonium platinous bromide and sodium platinous iodide. The reaction is facilitated by the inclusion of a solvent such as chloroform in the reaction mixture to dissolve the reaction product, although the use of such solvent is not essential. With the more reactive alkyl sulfides, such as methyl sulfide and ethyl sulfide, reaction temperatures around room temperature or lower give good results, and the reaction is substantially complete after 8 to 24 hours' stirring of the reaction mixture at room temperature. Higher temperatures may be used with advantage in the case of less reactive sulfides, such as butyl sulfide, but temperatures above 100° C. should be avoided due to the ease with which the halogenoplatinous mercaptide-alkyl sulfide complexes decompose at higher temperatures.

While the above method works well with relatively inactive mercaptans such as tertiary alkyl mercaptans, it is usually preferable when using more reactive mercaptans such as the lower primary alkyl mercaptans to first form the well known complex of the platinous halide with two molecules of alkyl sulfide and to then add the mercaptan in order to minimize the formation of platinous dimercaptides. The mercaptan may be added slowly or in increments to avoid an excess of mercaptan in the reaction mixture.

Hydrogen halide is formed in the reaction of the mercaptan with the platinous halide and the reaction product may be neutralized with a mild base such as sodium carbonate, if desired. This is not essential, however, and it is usually sufficient to wash the reaction product with water to remove any acid and inorganic salts that may be present.

The complexes of the invention in which X is bromine or iodine may be prepared directly from platinous bromide or iodide. They may also be prepared by treating a complex in which X is chlorine with an alkali metal bromide or iodide and removing the resulting alkali metal chloride.

Reaction products that are crystalline may be purified by recrystallization. Some of the non-crystalline reaction products may be obtained in a purified amorphous state by diluting a concentrated solution in, for example, chloroform or toluene, with a solvent such as methanol in which the product is sparingly soluble. Such purification is not usually necessary, however, and the crude reaction products are suitable for use in decorating compositions. Any solvent used in the reaction and any excess alkyl sulfide may be mostly removed by evaporation, preferably at room temperature, at atmospheric or reduced pressures. Higher temperatures may be used, but prolonged heating or temperatures above 100° C. should be avoided. For convenience in handling, crude products which are viscous oils or resins may be dissolved in a minimum amount of a solvent such as toluene to give a moderately viscous, easily poured, concentrated solution containing 20 percent or more of platinum. Moderately viscous concentrates containing 37 percent or more of platinum can be obtained with the preferred complexes of the invention. The concentrates are suitable for compounding with organic decorating vehicles and fluxes to form decorating compositions.

Pure mercaptans are not essential to the practice of the invention, and mixtures of mercaptans may be used. The preferred mercaptans are tertiary alkyl mercaptans or mixtures of tertiary alkyl mercaptans obtained by the catalytic addition of hydrogen sulfide to various olefins and olefin polymers. The preparation of such mixtures has been described, for example, by Schulze, Lyon and Short, Ind. Eng. Chem. 40, 2308 (1948). Such mixtures, while they may be fractionated to give an average molecular weight corresponding to a particular tertiary alkyl mercaptan, will contain components having a smaller or larger number of carbon atoms in the molecule and having a wide variety of molecular structures which cannot be separated by the usual methods of fractional distillation. Mixtures of alkyl sulfides may also be employed to give mixtures of halogenoplatinous mercaptide-alkyl sulfide complexes suitable for use in decorating compositions.

The decorating compositions of the invention are compositions which form a metallic film when applied to various surfaces and heated. Decorating compositions containing platinum for use on glass and ceramics are known in the art and have been described by Chemnitius, Sprechsaal 60, 226 (1927); C.A. 24, 4909. Such compositions contain a platinum sulphoresinate prepared by causing a platinum salt to react with a sulfurized terpene such as sulfurized Venetian turpentine. The platinum sulphoresinate is dissolved in vehicles such as oils of lavender, rosemary, aniseed, sassafras, wintergreen and fennel, turpentine, various terpenes, nitrobenzene and the like and is mixed with fluxes such as salts and resinates of rhodium, chromium, bismuth, lead, cadmium, tin, copper, cobalt, antimony and uranium and with resins such as Assyrian asphalt and various rosins to form decorating compositions. Such compositions are known as liquid bright platinums. Other compositions containing products obtained by causing platinic chloride to react with oil of rosemary and with oil of lavender have been described by G. F. Taylor, J. Optical Soc. Am. 18, 138–42 (1929); C. A. 23, 5360. Platinum sulphoresinates have also been used in conjunction with other precious metal sulphoresinates. The inclusion of a platinum sulphoresinate in a liquid bright gold gives compositions known as liquid bright silvers due to the silvery appearance of the fired film, although they contain no silver. Burnish platinums have been obtained by incorporating a platinum sulphoresinate in a burnish gold.

The platinum compounds previously employed in decorating compositions have the disadvantage of a relatively low solubility in organic solvents. The platinum sulphoresinates give usable solutions in carefully selected solvents containing only about 12 percent platinum, higher concentrations being too viscous to handle, and when other ingredients such as fluxes and resins are added, the resulting decorating composition will contain a maximum of only 7 or 8 percent platinum. This limits the thickness of the platinum film that can be obtained from such compositions, and severely restricts the choice of vehicles that may be used. The preferred platinum complexes of this invention are highly soluble in a wide range of organic solvents. They can be used advantageously in place of platinum sulphoresinates in known decorating compositions, and in addition many vehicles may be used with them that are not compatible with previously known compositions. As an example of this, platinum sulphoresinate is soluble in ethyl acetate at room temperature to the extent of less than 0.1 percent by weight, giving solutions containing less than 0.03 percent platinum. In contrast, the preferred complexes of this invention have excellent solubility in ethyl acetate, and many of them, for example the complexes of Examples II, III and VI, give moderately viscous, easily pourable solutions in ethyl acetate at room temperature containing 30 percent or more by weight of platinum.

The platinum compounds previously used in decorating compositions require relatively high temperatures to form a metallic film, limiting their application to the decoration of relatively refractory materials such as glass, ceramics, metals, quart, carbon, mica and other materials that are not damaged by the high temperature required. An outstanding advantage of the platinum complexes of this invention is the relatively low temperature required to form a metallic film therefrom, extending their application to a wide range of plastics, plastic laminates, wood, paper, textiles, leather and the like that would be damaged by high temperatures. A roughly quantitative estimate of the firing temperatures required was made by brushing solutions in toluene, or in the case of the less soluble complexes in a mixture of toluene and chloroform, of various platinum compounds, adjusted to a platinum content of 5 percent, onto glass slides. After evaporation of solvent, the slides were heated for one hour in a precisely controlled mechanical convection oven, and the films obtained were tested for conductivity. The tests were repeated at temperature intervals of 5° C. to determine within 5° C. the minimum temperature required to produce conductivity showing the formation of a continuous film of metallic platinum on the slide. It will be recognized that firing would ordinarily be conducted at a higher temperature or for a longer period of time in order to obtain maximum conductivity and brilliance of the film. Nevertheless, the minimum firing temperatures obtained in this manner give a reproducible index of the relative temperatures required for practical decorating compositions. The results of these tests are listed in Table I. It will be seen that the halogenoplatinous mercaptide-alkyl sulfide complexes requires distinctly lower firing temperatures than do the platinum sulphoresinates of the prior art. Although the previously used reaction products of platinic chloride with oil of rosemary and oil of lavender were not tested, they are known to requiring firing temperatures of the order of 320° C. or higher. It will also be seen from Table I that the lowest firing temperatures were obtained from compounds of the invention derived from secondary and tertiary alkyl mercaptans, and such chloroplatinous secondary and tertiary alkyl mercaptide-alkyl sulfide complexes are definitely preferred because of their low firing temperatures.

TABLE I.—MINIMUM TEMPERATURES REQUIRED TO OBTAIN A CONDUCTIVE FILM IN ONE HOUR

| Example | Compound | Temp., °C. |
|---|---|---|
| | Platinum sulphoresinate | 240 |
| I | Chloroplatinous tert.-hexylmercaptide-methyl sulfide | 175 |
| II | Chloroplatinous tert.-heptylmercaptide-methyl sulfide | 170 |
| III | Chloroplatinous tert.-heptylmercaptide-ethyl sulfide | 180 |
| IV | Chloroplatinous tert.-heptylmercaptide-ethylmercapto-ethanol | 180 |
| V | Chloroplatinous tert.-heptylmercaptide-butylethyl sulfide | 180 |
| VI | Chloroplatinous tert.-heptylmercaptide-butyl sulfide | 180 |
| VII | Chloroplatinous tert.-heptylmercaptide-tetrahydro-thiophene | 180 |
| VIII | Chloroplatinous n-dodecylmercaptide-methyl sulfide | 210 |
| IX | Chloroplatinous tert.-dodecylmercaptide-methyl sulfide | 170 |
| X | Chloroplatinous isooctyloxycarbonylmethylmercaptide-methyl sulfide | 210 |
| XI | Chloroplatinous α-methylbenzylmercaptide-ethyl sulfide | 185 |
| XII | Chloroplatinous pinenemercaptide-methyl sulfide | 205 |
| XIII-A | Chloroplatinous methylmercaptide-propyl sulfide | 195 |
| XIII-B | Chloroplatinous ethylmercaptide-propyl sulfide | 190 |
| XIII-C | Chloroplatinous ethylmercaptide-methyl butyl sulfide | 195 |
| XIII-D | Chloroplatinous n-propylmercaptide-ethyl sulfide | 195 |
| XIII-E | Chloroplatinous n-propylmercaptide-methyl butyl sulfide | 190 |
| XIII-F | Chloroplatinous isopropylmercaptide-ethyl sulfide | 180 |
| XIII-G | Chloroplatinous n-butylmercaptide-ethyl sulfide | 185 |
| XIII-H | Chloroplatinous isobutylmercaptide-ethyl sulfide | 190 |
| XIII-I | Chloroplatinous sec.-butylmercaptide-ethyl sulfide | 175 |
| XIII-J | Chloroplatinous tert.-butylmercaptide-ethyl sulfide | 175 |
| XIII-K | Chloroplatinous n-amylmercaptide-methyl sulfide | 190 |
| XIII-L | Chloroplatinous n-amylmercaptide-ethyl sulfide | 185 |
| XIII-M | Chloroplatinous isoamylmercaptide methyl sulfide | 190 |
| XIII-N | Chloroplatinous isoamylmercaptide-ethyl sulfide | 185 |
| XIII-O | Chloroplatinous n-hexylmercaptide-ethyl sulfide | 175 |
| XVII | Chloroplatinous n-octylmercaptide-methyl sulfide | 180 |
| XVIII | Chloroplatinous n-octylmercaptide-ethyl sulfide | 175 |
| XIX | Chloroplatinous n-octylmercaptide-tetrahydrothiophene | 175 |
| XX | Chloroplatinous ethylmercaptide-butyl sulfide | 190 |

The ability to form a metallic film at relatively low temperatures is a distinct advantage even in applications on relatively refractory materials where it may be desirable to heat the material to the point of incipient softening, which may vary from about 500° C. for a soft glass to about 800° C. for a porcelain, and even higher for very refractory materials such as Pyroceram and quartz to improve the adherence of the metallic film. The initial formation of the metallic film should take place in an oxidizing atmosphere in order to promptly and completely remove organic matter from the film. This oxidizing atmosphere is usually provided by good ventilation of the oven or kiln in which the metallic film is produced, and such ventilation becomes increasingly difficult and costly with increases in temperature, since heat is lost to the air introduced by ventilation. Once the metallic film has been developed, further heating may be accomplished without good ventilation and consequent heat loss.

While the decorative effect is an outstanding property of the film of metal produced from platinum decorating compositions, these films inherently possess other useful properties such as a high degree of reflectivity to light, making them useful as reflectors and mirrors, and reflectivity to infrared radiation, making them useful as reflectors for lamps, ovens and the like and to protect materials exposed to high temperatures; electrical conductivity, making them useful in forming printed circuits, resistors and capacitors and as bases for soldering connections to non-conductive materials, for electroplating and for plating by dipping in molten metals and alloys; and mechanical strength, making them useful in forming vacuum tight glass to metal seals and the like. Very thin films of metal produced from platinum decorating compositions show selective transmission of light, including ultra-violet light, making them useful as optical filters. In speaking of decoration and decorating compositions, it is intended to include the other useful properties inherent in the metal films produced.

In addition to a platinum compound capable of producing a film of metallic platinum when heated, platinum decorating compositions usually include an organic decorating vehicle and a flux. The choice of vehicle controls the behavior of the composition before firing and is dictated by the method by which the composition is to be applied. In addition to simple solvents, the vehicle includes mixtures of essential oils, terpenes, resins and the like, carefully chosen to impart specific physical properties to the composition. These properties, such as oiliness, viscosity, evaporation rate, surface tension and tack, will vary for different methods of application, such as brushing, spraying, stippling, stamping, printing, both direct and offset, hot or cold screen printing, stenciling, decalcomania, and the like. The requisite properties and the vehicles required to produce them are well known to those skilled in the art of making inks, paints and lacquers. Typical vehicles include mixtures of two or more of the following ingredients: methyl ethyl ketone, cyclohexanone, ethyl acetate, amyl acetate, Cellosolve, butanol, nitrobenzene, toluene, xylene, petroleum ether, chloroform, carbon tetrachloride, various terpenes such as pinene, dipentene, dipentene oxide, and the like, essential oils, such as oils of lavender, rosemary, aniseed, sassafras, wintergreen, fennel and turpentine, Assyrian asphalt, various rosins and balsams, and synthetic resins. It is an advantage of the preferred platinum complexes of this invention that they are soluble in a wide range of vehicles. This permits a very wide latitude in the choice of vehicles and permits the use of desirable ingredients such as lacquers, synthetic resins and the like that are not commonly incorporated into platinum decorating compositions.

The choice of ingredients for the flux determines the behavior of the platinum film during and after firing and is usually dictated by the composition of the article to be decorated and the use for which it is intended. The flux will usually contain small amounts of salts or resinates of rhodium or iridium to improve the continuity and brilliance of the platinum film. Other ingredients, such as salts and resinates of bismuth, chromium, lead, cadmium, tin, copper, cobalt, antimony and uranium, are employed to improve the adherence of the platinum film and its resistance to abrasion. The ingredients fuse to a low melting glass or glaze and are well understood by those skilled in the art of compounding glazes and porcelain enamels. The conventional glazes can not be used to promote adherence of the platinum film to non-refractory materials such as plastics, wood, paper and the like, and the platinum film on such material usually will be protected by a coating of a lacquer or varnish, or by laminating a thin film of plastic to the surface. A lacquer may also be incorporated in the platinum decorating composition to provide an adherent film.

The platinum decorating compositions have many uses, particularly where a very hard film is desired or where ease of soldering is a factor. For many applications, however, decorating compositions that also contain other precious metals such as gold, palladium or silver are preferred. Various decorative effects may be obtained from compositions containing mixtures of platinum and gold. When the ratio of platinum to gold is of the order of 1 to 9, films with a reddish tint are obtained. When the ratio of platinum to gold is of the order of 2 to 8, the film is almost white but still has some tint of gold or red. When the ratio of platinum to gold is between about 3 to 7 and 7 to 3 a silvery white film is obtained, and such compositions are known as liquid bright silvers or more properly as liquid bright platinums, since they contain no silver. A bright grey to black film is obtained when the ratio of platinum to gold is of the order of 9 to 1. Where such combinations with gold are desired, the complexes of this invention may be combined with liquid bright golds of the types described by Chemnitius, J. Prakt. Chem. 117, 245 (1927), and by Ballard, U.S. Patent 2,490,399. Preferably, however, they are combined with liquid bright golds of the type described in U.S. patent application Serial No. 727,254, filed April 9, 1958, thus taking advantage of the low firing characteristics of both the gold and the platinum compounds. The electrical properties such as resistance, temperature coefficient of resistance and the like of the metallic films may also be varied by including varying amounts of liquid bright gold or resinates or sulphoresinates of silver or palladium and in some cases of base metals such as lead, aluminum, bismuth and silicon in the platinum decorating composition.

Burnish platinum decorating compositions are obtained by incorporating a platinum complex of the invention in a burnish gold decorating composition. Conventional burnish gold compositions containing finely divided metallic gold such as those described by F. Chemnitius, J. Prakt. Chem., 117, 245 (1927), by K. H. Ballard, U.S. Patent 2,383,704, and by G. S. Chandra, British Patent 721,906, may be employed. Preferably, however, lower firing compositions such as those described in U.S. patent application Serial No. 727,254, filed April 9, 1958, and U.S. patent application Serial No. 774,820, filed November 19, 1958, are used. The burnish platinum decorating compositions give somewhat matte films that after burnishing have a soft lustrous appearance rather than the bright metallic appearance of the films obtained from the bright platinums. The colors of the films obtained from the burnish platinum decorating compositions may be varied by adding varying amounts of liquid bright golds as was previously described.

The complexes of the invention in which R and Y combined contain at least 9 carbon atoms are greatly preferred due to their high solubilities in a wide range of solvents. Decorating compositions satisfactory for some purposes can be obtained with compounds of lesser solubility, however, and this invention embraces decorating compositions containing halogenoplatinous mercaptidealkyl sulfide complexes broadly. Complexes of moderate solubility may be used where a low platinum content is desired, for example in platinum containing lusters, and where the method of application permits the use of organic decorating vehicles of high solvent power such as mixtures of chloroform and nitrobenzene or chloroform and toluene. Complexes of low solubility do not give liquid bright platinums but may be employed as suspensions in organic decorating vehicles to give burnish platinums. Such burnish platinums give harder films more suitable for soldering than those containing metallic gold.

The invention will be further illustrated by reference to the following specific examples:

*Example I*

CHLOROPLATINOUS TERT.-HEXYLMERCAPTIDE-METHYL SULFIDE

The mercaptan used in this example was of practical grade of the type described in Ind. Eng. Chem. 40, 2308 (1948). To a solution of 20.76 g. potassium platinous chloride (0.05 mole) in 200 cc. water was added 25 cc. chloroform, 6.04 g. tert.-hexyl mercaptain of 98 percent purity by mercaptan assay (0.05 mole) and 3.72 g.

methyl sulfide (0.06 mole), and the mixture was stirred at room temperature. The temperature increased from 27 to 32° C., and the chloroform layer became a pasty mass that slowly liquified. After 24 hours the aqueous layer was colorless, and the chloroform layer was a clear, pale amber liquid. The supernatant aqueous layer was removed by siphoning, and the residual chloroform layer was washed well with three 150 cc. portions of water, removing the water by siphoning after each wash. Remaining water and a little emulsion were removed in a separatory funnel, and the chloroform solution was filtered by gravity. The flask, funnel and filter were washed with 30 cc. chloroform, which was added to the filtrate. After standing in an open dish with occasional stirring until most of the solvent had evaporated, the filtrate gave 20.75 g. of a dark yellow paste containing 43.6 percent Pt. This is a yield of 93.1 percent theory based on platinum. Toluene was added to the paste to give a clear amber solution containing 30.9 percent Pt.

*Example II*

CHLOROPLATINOUS TERT.-HEPTYLMERCAPTIDE-METHYL SULFIDE

This material was prepared substantially as described in Example I, using 0.05 mole practical grade tert.-heptyl mercaptan of the type described in Example I rather than tert.-hexyl mercaptan. After evaporation of most of the solvent, the product was 22.45 g. very viscous oil containing 40.2 percent Pt. This is a yield of 92.4 percent theory based on platinum. The oil is miscible in all proportions with toluene, and a clear, amber, moderately viscous solution containing 37.2 percent Pt was obtained in toluene.

*Example III*

CHLOROPLATINOUS TERT.-HEPTYLMERCAPTIDE-ETHYL SULFIDE

To a solution of 20.76 g. potassium platinous chloride (0.05 mole) in 200 cc. water was added 25 cc. chloroform, 6.77 g. practical grade tert.-heptyl mercaptan of the type described in Example I and of 98 percent purity by mercaptan assay (0.05 mole) and 4.96 g. ethyl sulfide (0.055 mole), and the mixture was stirred at 35–8° C. After 7 hours, the aqueous layer was still amber in color, and 1.35 g. ethyl sulfide (0.015 mole) was added. After stirring at 35–8° C. for 17 hours longer, the aqueous layer was colorless and the chloroform layer was a clear, pale amber liquid. The chloroform layer was washed with water and filtered substantially as described in Example I. After evaporation of most of the solvent, the product was 23.59 g. viscous oil containing 38.9 percent Pt. This is a yield of 94.0 percent theory based on platinum. The oil is miscible in all proportions with toluene, and a clear amber, moderately viscous solution containing 34.8 percent Pt was obtained in toluene.

*Example IV*

CHLOROPLATINOUS TERT.-HEPTYLMERCAPTIDE-ETHYLMERCAPTOETHANOL

This material was prepared substantially as described in Example II, using 0.06 mole ethylmercaptoethanol rather than methyl sulfide. After evaporation of most of the solvent, the product was 20.73 g. viscous oil containing 37.1 percent Pt. This is a yield of 79.0 percent theory based on platinum. The oil is very soluble in toluene and gave a clear, moderately viscous, pale amber solution in toluene containing 32.8 percent Pt.

*Example V*

CHLOROPLATINOUS TERT.-HEPTYLMERCAPTIDE-BUTYL ETHYL SULFIDE

To a solution of 20.76 g. potassium platinous chloride (0.05 mole) in 200 cc. water was added 25 cc. chloroform, 6.77 g. practical grade tert.-heptyl mercaptan of the type described in Example I and of 98 percent purity by mercaptan assay (0.05 mole) and 6.50 g. n-butyl ethyl sulfide (0.055 mole). There was no evidence of immediate reaction. After stirring 48 hours at ca. 30° C., sodium carbonate (2.49 g.) was added to just neutralized the aqueous layer. After stirring 5 hours at ca. 55° C., the aqueous layer was again acid and was neutralized with 0.21 g. sodium carbonate. There was no further change in appearance or pH on stirring 4 hours longer at ca. 55° C. The total sodium carbonate required for neutralization was 0.0245 mole, indicating virtually complete reaction of the mercaptan. The chloroform layer was washed with water and filtered substantially as described in Example I. After evaporation of most of the solvent, the product was 24.98 g. viscous oil containing 37.9 percent Pt. This is a yield of 96.7 percent theory based on platinum. The oil is miscible in all proportions with toluene, and a clear, moderately viscous, pale amber solution containing 34.2 percent Pt was obtained in toluene.

*Example VI*

CHLOROPLATINOUS TERT.-HEPTYLMERCAPTIDE-BUTYL SULFIDE

To a solution of 41.90 g. potassium platinuous chloride (0.10 mole) in 250 cc. of water was added 15.36 g. butyl sulfide (0.105 mole) and 14.21 g. practical grade tert.-heptyl mercaptan of the type described in Example I and of 98 percent purity by mercaptan assay (0.105 mole). The mixture was stirred and heated to 90° C. during ¾ hour and at about 90° C. for 6½ hours. The chloroform layer was washed with water and filtered substantially as described in Example I. After removal of solvent by heating in an open dish on the steam bath with occasional stirring for 2½ hours, the product was 46.26 g. viscous dark amber oil containing 39.6 percent Pt. This is a yield of 96.0 percent theory based on platinum. The oil is soluble to the extent of at least 75 percent by weight, giving solutions containing at least 30 percent by weight of platinum, at room temperature in the following solvents: chloroform, carbon tetrachloride, petroleum ether, heptane, kerosene, toluene, nitrobenzene, butanol, benzyl alcohol, Cellosolve, butyl Cellosolve, acetone, methylethyl ketone, cyclohexanone, ethyl acetate, butyl acetate, ethyl ether, turpentine, pinene, terpineol, eugenol, cedrol, oil of camphor, oil of clove, oil of lavender (imitation), oil of sandalwood, and oil of spike.

*Example VII*

CHLOROPLATINOUS TERT.-HEPTYLMERCAPTIDE-TETRAHYDROTHIOPHENE

This material was prepared substantially as described in Example II, using 0.055 mole tetrahydrothiophene rather than 0.06 mole methyl sulfide. After evaporation of most of the solvent, the product was 25.03 g. very viscous oil containing 38.3 percent Pt. This is a yield of 98.4 percent theory based on platinum. The oil is miscible in all proportions with toluene, and a clear, moderately viscous, pale amber solution containing 33.9 percent Pt was obtained in toluene.

*Example VIII*

CHLOROPLATINOUS n-DODECYLMERCAPTIDE-METHYL SULFIDE

To a solution of 20.76 g. potassium platinous chloride (0.05 mole) in 200 cc. water was added 25 cc. chloroform and 6.21 g. methyl sulfide (0.10 mole). The temperature increased from 25 to 31° C., and a solid separated. After stirring for one-half hour, 12.19 g. n-dodecyl mercaptan of 95 percent purity by mercaptan assay (0.055 mole) was added in four equal portions at two hour intervals while stirring at ca. 30° C. After an additional 18 hours of stirring, the chloroform layer still contained a little solid. The aqueous layer was neutralized by adding sodium carbonate, 1.11 g. more n- dodecyl mercaptan (0.005 mole) was added, and the mixture was stirred at ca. 48° C. for 3 hours. After again neutralizing the aqueous layer with sodium carbonate, there was no further change in pH on stirring at ca. 48° C. for an hour longer, and the chloroform layer no longer contained any solid. The chloroform layer was washed with water and filtered substantially as described in Example I, and most of the solvent was allowed to evaporate. The residue was dissolved in 5 cc. toluene plus 3 cc. chloroform, diluted with 50 cc. 30–60° C. petroleum ether, iced well and filtered from 0.98 g. insoluble material. After evaporation of most of the solvent from the filtrate, the product was 23.13 g. viscous oil containing 34.8 percent Pt. This is a yield of 82.8 percent theory based on platinum. The oil is very soluble in toluene, and a clear amber solution containing 24.3 percent Pt was obtained in toluene.

*Example IX*

CHLOROPLATINOUS TERT.-DODECYLMERCAPTIDE-METHYL SULFIDE

This material was prepared substantially as described in Example I, using 0.05 mole practical grade tert.-dodecyl mercaptan of the type described in Example I and of 95 percent purity by mercaptan assay rather than tert.-heptyl mercaptan. After evaporation of most of the solvent, the product was 25.33 g. very viscous oil containing 36.2 percent Pt. This is a yield of 94.0 percent theory based on platinum. The oil is miscible in all proportions with toluene, and a clear, pale amber, moderately viscous solution containing 32.8 percent Pt was obtained in toluene.

*Example X*

CHLOROPLATINOUS ISOOCTYLOXYCARBONYLMETHYLMERCAPTIDE-METHYL SULFIDE

This material was prepared substantially as described in Example I, using 0.55 mole isooctyl thioglycolate rather than 0.05 mole tert.-hexyl mercaptan. After evaporation of most of the solvent, the product was 22.16 g. viscous oil containing 34.5 percent Pt. This is a yield of 78.3 percent theory based on platinum. The oil is miscible in all proportions with toluene, and a clear, pale amber, moderately viscous solution containing 30.8 percent Pt was obtained in toluene.

*Example XI*

CHLOROPLATINOUS α-METHYLBENZYLMERCAPTIDE-ETHYL SULFIDE

To a solution of 20.76 g. potassium platinous chloride (0.05 mole) in 200 cc. water was added 25 cc. chloroform and 4.96 g. ethyl sulfide (0.055 mole). After stirring for one-half hour, 8.18 g. α-methylbenzyl mercaptan (0.055 mole) was added in four equal portions at two hour intervals. The mixture was stirred at ca. 30° C. for 18 hours longer, and the aqueous layer was neutralized with sodium carbonate. The chloroform layer was washed with water and filtered substantially as described in Example I. After evaporation of most of the solvent, the product was 26.41 g. very viscous oil containing 35.6 percent Pt. This is a yield of 96.6 percent theory based on platinum. The oil is miscible in all proportions with toluene, and a clear, pale amber, slightly viscous solution containing 32.1 percent Pt was obtained in toleune.

*Example XII*

CHLOROPLATINOUS PINENEMERCAPTIDE-METHYL SULFIDE

This material was prepared substantially as described in Example I, using 0.05 mole pinene mercaptan rather than tert.-hexyl mercaptan. The pinene mercaptan was prepared from α-pinene as described in U.S. Patent 2,402,698 and boiled at 110–112° C. at 25 mm. After evaporation of most of the solvent, the produce was 30.75 g. very viscous oil containing 31.8 percent Pt. This is a yield of 98.6 percent theory based on platinum. The oil is miscible in all proportions with toluene, and a clear, pale amber, moderately viscous solution containing 27.1 percent Pt was obtained in toluene.

*Example XIII*

The following method was used to make a series of chloroplatinous mercaptide-alkyl sulfide complexes. To a mixture of 25 cc. chloroform and a solution of 0.05 mole potassium platinous chloride in 200 cc water was added 0.10 mole of alkyl sulfide. After stirring at room temperature for 2 to 3 hours, 0.05 mole of alkyl mercaptan was added, and stirring at room temperature was continued until reaction was complete as shown by the presence of a colorless aqueous layer and a pale yellow to amber chloroform layer. The reaction time varied from an hour or less for the lower mercaptans to a day or two for the higher mercaptans. The chloroform layer was washed with water and filtered substantially as described in Example I and was left in an open dish at room temperature with occasional stirring for several days until most of the solvent and excess alkyl sulfide had evaporated. The crude product thus obtained was purified when possible by crystallization from various solvents. The following products were obtained by using the appropriate alkyl sulfide and alkyl mercaptan in the reaction:

A. *Chloroplatinous methylmercaptide-propyl sulfide.*—The crude product contained a little solid material that was removed by stirring with methanol, in which the solid is very insoluble, and filtering. Evaporation of methanol from the filtrate at room temperature left 18.64 g. of very viscous yellow oil containing 47.21 percent platinum.

B. *Chloroplatinous ethylmercaptide-propyl sulfide.*—The crude product was 11.00 g. very viscous yellow oil containing 44.67 percent platinum.

C. *Chloroplatinous ethylmercaptide-methyl butyl sulfide.*—The crude product was 20.12 g. very viscous yellow oil containing 46.62 percent platinum.

D. *Chloroplatinous n-propylmercaptide-ethyl sulfide.*—The crude product was 17.32 g. oily crystals. Two crystallizations from acetone gave yellow crystals melting at 107–109.5° C. and containing 49.26 percent platinum.

E. *Chloroplatinous n-propylmercaptide-methyl butyl sulfide.*—The crude product was 20.10 g. very viscous yellow oil containing 45.91 percent platinum.

F. *Chloroplatinous isopropylmercaptide-ethyl sulfide.*—The crude product was 18.40 g. solid. Crystallization from a mixture of chloroform and methanol and from benzene gave yellow crystals melting at 167–168° C. and containing 48.98 percent platinum.

G. *Chloroplatinous n-butylmercaptide-ethyl sulfide.*—The crude product was 18.50 g. oily solid. Two crystallizations from acetone gave yellow crystals melting at 121–124° C. and containing 47.36 percent platinum.

H. *Chloroplatinous isobutylmercaptide-ethyl sulfide.*—The crude product was 19.31 g. solid. Crystallization from methanol and from a mixture of chloroform and petroleum ether gave yellow crystals melting at 79.5–81° C. and containing 47.47 percent platinum.

I. *Chloroplatinous sec.-butylmercaptide-ethyl sulfide.*—The crude product was 19.42 g. solid. Crystallization from acetone gave yellow crystals melting at 135–137.5° C. and containing 47.47 percent platinum.

J. *Chloroplatinous tert.-butylmercaptide-ethyl sulfide.*—The crude product was 19.10 g. solid. Crystallization from isopropanol gave yellow crystals melting at 142–144° C. and containing 47.44 percent platinum. Crystallization from toluene gave crystals of indefinite melting point containing toluene of crystallization.

K. *Chloroplatinous n-amylmercaptide-methyl sulfide.*—The crude product was 16.26 g. very viscous yellow oil containing 48.16 percent platinum.

L. *Chloroplatinous n-amylmercaptide-ethyl sulfide.*—The crude product was 20.56 g. oily solid. Crystallization from a mixture of acetone, petroleum ether and methanol gave yellow crystals melting at 72–75° C. and containing 46.28 percent platinum.

M. *Chloroplatinous isoamylmercaptide - methyl sulfide.*—The crude product was 17.64 g. very viscous yellow oil containing 45.05 percent platinum.

N. *Chloroplatinous isoamylmercaptide-ethyl sulfide.*—The crude product was 20.15 g. solid. Crystallization from acetone gave yellow crystals melting at 124.5–126° C. and containing 45.98 percent platinum.

O. *Chloroplatinous n-hexylmercaptide-ethyl sulfide.*—The crude product was 20.72 g. very viscous yellow oil containing 47.00 perecent platinum.

P. *Chloroplatinous tert. - amylmercaptide - methyl sulfide.*—The crude product was 20.99 g. oily solid. Three crystallizations from toluene gave yellow crystals containing 48.86 percent platinum that darken about 140° C. and decompose without melting above 200° C.

Example XIV

LIQUID BRIGHT SILVER DECORATING COMPOSITIONS

As an example of the use of a halogenoplatinous mercaptide-alkyl sulfide in a decorating composition containing both gold and platinum, a mixture of the following ingredients was prepared.

| Ingredient | Parts by weight |
|---|---|
| Chloroplatinous tert.-heptylmercaptide-methyl sulfide as described in Example II dissolved in toluene (35 percent Pt) | 143 |
| Gold tert.-dodecylmercaptide as described in Example VIIb of U.S. Patent application Serial No. 727,254, filed April 9, 1958, dissolved in heptane (30 percent Au) | 167 |
| Rhodium resinate dissolved in a mixture of essential oils and hydrocarbons (1 percent Rh) | 50 |
| Bismuth resinate dissolved in a mixture of essential oils (4.5 percent Bi) | 70 |
| Chromium resinate dissolved in a mixture of cyclohexanone and oil of turpentine (2.05 percent Cr) | 20 |
| Asphalt dissolved in oil of turpentine (30 percent asphalt) | 200 |
| Chloroform | 176 |
| Nitrobenzene | 170 |
| Oil soluble red dye | 4 |
| Total | 1,000 |

The clear dark red solution thus obtained contained 5 percent platinum, 5 percent gold, 0.05 percent rhodium, 0.32 percent bismuth, 0.04 percent chromium and 6 percent asphalt. It was applied by brushing to various articles, which were heated in a kiln to a specified firing temperature and held at this temperature for 10 to 20 minutes and then slowly cooled. In every case a beautiful, conductive, silvery adherent film was obtained. The properties of the film vary somewhat with the nature of the underlying surface and are summarized below.

| Article | Firing temperature, ° C. | Appearance of film |
|---|---|---|
| Quartz Crystal | 450 | semi-bright. |
| Sheet mica | 450 | bright. |
| Aluminum AL-2-S panel | 450 | semi-bright. |
| Stainless steel sheet, type 302 | 600 | bright. |
| Titanium metal panel, unpolished surface | 600 | matte. |
| White porcelain enamel on steel | 600 | bright. |
| Soda lime clear glass tumbler | 600 | Do. |
| Soda lime clear glass bottle | 600 | Do. |
| Tempered soda lime opal glass dish | 650 | Do. |
| Borosilicate opal glass dish | 650 | semi-bright. |
| Borosilicate clear glass tubing | 650 | bright. |
| A glass composition known as Pyroceram | 740 | Do. |
| Glazed earthenware dish | 740 | Do. |
| Hard porcelain dish | 740 | Do. |

Example XV

LIQUID BRIGHT PLATINUM DECORATING COMPOSITIONS

A. As an example of the use of a halogenoplatinous mercaptide-alkyl sulfide in a conventional liquid bright platinum decorating composition, a mixture of the following ingredients was prepared.

| Ingredient | Parts by weight |
|---|---|
| Chloroplatinous tert.-heptylmercaptide-methyl sulfide as described in Example II dissolved in toluene (30 percent Pt) | 167 |
| Rhodium resinate dissolved in a mixture of essential oils and hydrocarbons (1 percent Rh) | 25 |
| Bismuth resinate dissolved in a mixture of essential oils (4.5 percent Bi) | 40 |
| Chromium resinate dissolved in a mixture of cyclohexanone and oil of turpentine (2.05 percent Cr) | 12 |
| Rosin dissolved in oil of turpentine (50 percent rosin) | 400 |
| Oil of turpentine | 194 |
| Toluene | 160 |
| Oil soluble red dye | 2 |
| Total | 1,000 |

The clear, dark red solution thus obtained contained 5 percent platinum, 0.025 percent rhodium, 0.18 percent bismuth, 0.025 percent chromium and 20 percent rosin. It was applied by brushing to various articles and fired. On a soda lime clear glass tumbler, fired to 600° C. in a continuous lehr on a 1¼ hour cycle, a film was obtained with a scum that washed off with water, leaving a brilliant, conductive adherent platinum mirror. On an earthenware dish, fired to 740° C., a bright, conductive platinum mirror with good adherence was obtained. On a porcelain dish, fired to 800° C., a bright, non-conductive grey film with good adherence was obtained. On a glass composition known as Pyroceram, fired to 850° C. and held at this temperature one-half hour, a bright, conductive adherent platinum mirror was obtained. On a silicone plastic fiberglass laminate known as Formica G-7 and on an epoxy plastic fiberglass laminate known as Continental Diamond GB28E, fired at 225° C. for from one to two hours, bright, adherent, conductive platinum mirrors were obtained that were readily solderable.

Similar results were obtained on the same materials under the same conditions using a decorating composition prepared by mixing the following ingredients.

| Ingredient | Parts by weight |
|---|---|
| Chloroplatinous tert.-heptylmercaptide-butyl sulfide as described in Example VI dissolved in oil of turpentine (30% Pt) | 167 |
| Rhodium resinate dissolved in a mixture of essential oils and hydrocarbons (1% Rh) | 50 |
| Bismuth resinate dissolved in a mixture of essential oils (4.5% Bi) | 40 |
| Chromium resinate dissolved in a mixture of cyclohexanone and oil of turpentine (2.05% Cr) | 12 |
| Rosin dissolved in oil of turpentine (50% rosin) | 400 |
| Oil of turpentine | 246 |
| Toluene | 81 |
| Oil soluble red dye | 4 |
| Total | 1,000 |

The clear dark red solution thus obtained contained 5 percent platinum, 0.05 percent rhodium, 0.18 percent bismuth, 0.025 percent chromium and 20 percent rosin.

B. As an example of the use of a halogenoplatinous mercaptide-alkyl sulfide in a liquid bright platinum decorating composition containing a lacquer, a mixture of the following ingredients was prepared.

| Ingredient | Parts by weight |
|---|---|
| Chloroplatinous tert.-heptylmercaptide methyl sulfide as described in Example II dissolved in toluene (35% Pt) | 286 |
| Rhodium resinate dissolved in a mixture of essential oils and hydrocarbons (2.5% Rh) | 20 |
| Bismuth resinate dissolved in a mixture of essential oils (4.5% Bi) | 70 |
| Chromium resinate dissolved in a mixture of cyclohexanone and oil of turpentine (2.05% Cr) | 20 |
| Rosin dissolved in oil of turpentine (50% rosin) | 300 |
| Nitrocellulose dissolved in a mixture of dibutyl phthalate and benzyl benzoate (2% nitrocellulose) | 200 |
| Oil soluble red dye | 4 |
| Total | 1,000 |

The clear, dark red solution thus obtained contained 10 percent platinum, 0.05 percent rhodium, 0.32 percent bismuth, 0.04 percent chromium, 15 percent rosin and 0.6 percent nitrocellulose. It was applied by brushing to the articles described in Example XIV and fired in the same manner, giving substantially identical results.

Example XVI

BURNISH PLATINUM DECORATING COMPOSITIONS

As an example of the use of halogenoplatinous mercaptide-alkyl sulfide in a burnish platinum decorating composition, the following ingredients were thoroughly mixed and ground in a steel roller mill to give a thick paste in which the solid components were in a finely divided state.

| Ingredient | Parts by weight |
|---|---|
| Chloroplatinous tert.-heptylmercaptide-methyl sulfide as described in Example II dissolved in toluene (35% Pt) | 50 |
| Gold tert.-octylmercaptide as described in Example II of U.S. patent application Serial No. 727,254, filed April 9, 1958 (57.4% Au) | 24 |
| Bismuth subnitrate (72% Bi) | 2 |
| Oil of spike | 24 |
| Total | 100 |

The resulting paste, which contained 17.5 percent platinum, 14.3 percent gold and 1.44 percent bismuth, was thinned to brushing consistency with a 50 percent solution of rosin in oil of turpentine and was applied by brushing to a soda lime clear glass tumbler, which was heated to about 600° C., held at this temperature for 10 minutes and slowly cooled. An adherent, conductive metallic film was obtained that had a somewhat dull appearance. When burnished lightly with a glass fiber burnisher, the film had the soft silvery luster characteristic of burnished platinum.

Example XVII

CHLOROPLATINOUS-n-OCTYLMERCAPTIDE-METHYL SULFIDE

A mixture of 41.86 g. potassium platinous chloride (0.10 mole) dissolved in 250 cc. water, 25 cc. chloroform and 14.90 g. methyl sulfide (0.24 mole) was stirred at room temperature for 20 minutes. The mixture was then cooled in an ice bath, and a solution of 14.63 g. n-octyl mercaptan (0.10 mole) in 50 cc. chloroform was slowly added with stirring at 2 to 3° C. during 4 hours. The mixture was stirred while warming to room temperature during 2 hours and left overnight. The chloroform solution was washed with three 200 cc. portions of water and filtered as described in Example I, and the filtrate was concentrated in an open dish with occasional stirring on a steam bath during 6 hours. The product was 34.98 g. viscous amber oil containing 44.0% platinum. The minimum firing temperature of the product, determined as previously described, was 180° C.

Example XVIII

CHLOROPLATINOUS n-OCTYLMERCAPTIDE-ETHYL SULFIDE

A mixture of 41.86 g. potassium platinous chloride (0.10 mole) dissolved in 250 cc. water, 25 cc. chloroform and 18.92 g. ethyl sulfide (0.21 mole) was stirred at room temperature for 3 hours. A solution of 14.63 g. n-octyl mercaptan (0.10 mole) in 50 cc. chloroform was then slowly added with stirring at room temperature during 4 hours, and the mixture was left overnight. The chloroform solution was washed and filtered as described in Example XVII. The filtrate was concentrated on a steam bath during 1½ hours and then heated on a steam bath at about 15 mm. pressure (water pump vacuum) for an additional 3 hours. The product was 43.66 g. pale amber, moderately viscous oil containing 42.3% platinum. The minimum firing temperature of the product, determined as previously described, was 175° C. The product was miscible in all proportions at room temperature with chloroform, toluene, butyl acetate, methyl ethyl ketone, isopropanol, heptane and turpentine. Decorating compositions prepared from the product fired well and had exceptionally good brushing properties.

Example XIX

CHLOROPLATINOUS n-OCTYLMERCAPTIDE-TETRAHYDROTHIOPHENE

A mixture of 41.86 g. potassium platinous chloride (0.10 mole) dissolved in 250 cc. water, 50 cc. chloroform and 18.52 g. tetrahydrothiophene (0.21 mole) was stirred at room temperature for 3 hours. The mixture was then cooled in an ice bath, and a solution of 14.63 g. n-octyl mercaptan (0.10 mole) in 50 cc. chloroform was slowly added with stirring at 2 to 3° C. during 2¾ hours. The mixture was stirred while warming to 14° C. during ¾ hour and left overnight. The chloroform solution was washed and filtered as described in Example XVII, and the filtrate was concentrated in an open dish with occasional stirring on a steam bath during 26 hours. The product was 43.44 g. pale amber, viscous oil containing 42.4% platinum. The minimum firing temperature of the product, determined as previously described, was 175° C.

Example XX

CHLOROPLATINOUS ETHYLMERCAPTIDE-BUTYL SULFIDE

A mixture of 41.86 g. potassium platinous chloride (0.10 mole) dissolved in 250 cc. water and 30.75 g. butyl sulfide (0.21 mole) was stirred while heating to 65° C. during 3 hours and at ca. 65° C. for 2½ hours. After adding 1.46 g. more butyl sulfide (0.01 mole), the mixture was stirred at ca. 90° C. for 2 hours. After adding 100 cc. water and 25 cc. chloroform, the mixture was cooled in an ice bath, and a solution of 6.21 g. ethyl mercaptan (0.10 mole) in 50 cc. chloroform was slowly added with stirring at 2 to 3° C. during 3 hours. The mixture was stirred while warming to 20° C. during 1 hour and left overnight. The chloroform solution was washed and filtered as described in Example XVII. The filtrate contained a small amount of an insoluble oil that was removed by stirring with 5 g. of diatomaceous earth and again filtering. The filtrate was concentrated in an open dish with occasional stirring on a steam bath during 13½ hours. The product was 39.53 g. pale amber, moderately viscous oil containing 44.6% platinum. The minimum firing temperature of the product, determined as previously described, was 190° C.

It will be obvious to those skilled in the art that many modifications may be made within the scope of the present invention without departing from the spirit thereof, and the invention includes all such modifications.

What is claimed is:

1. A decorating composition comprising a halogenoplatinous mercaptide-alkyl sulfide complex and an organic decorating vehicle.

2. A decorating composition comprising a chloroplatinous n-octylmercaptide-ethyl sulfide complex and an organic decorating vehicle.

3. A decorating composition comprising a chloroplatinous tert.-heptylmercaptide-methyl sulfide complex and an organic decorating vehicle.

4. A decorating composition comprising a chloroplatinous tert.-heptylmercaptide-ethyl sulfide complex and an organic decorating vehicle.

5. A decorating composition comprising a chloroplatinous tert.-heptylmercaptide-butyl sulfide complex and an organic decorating vehicle.

6. A decorating composition comprising a chloroplatinous tert.-heptylmercaptide-tetrahydrothiophene complex and an organic decorating vehicle.

7. A decorating composition comprising a halogenoplatinous mercaptide-alkyl sulfide complex, an organic decorating vehicle and a flux.

8. A decorating composition comprising a chloroplatinous n-octylmercaptide-ethyl sulfide complex, an organic decorating vehicle and a flux.

9. A decorating composition comprising a chloroplatinous tert.-heptylmercaptide-methyl sulfide complex, an organic decorating vehicle and a flux.

10. A decorating composition comprising a chloroplatinous tert.-heptylmercaptide-ethyl sulfide complex, an organic decorating vehicle and a flux.

11. A decorating composition comprising a chloroplatinous tert.-heptylmercaptide-butyl sulfide complex, an organic decorating vehicle and a flux.

12. A decorating composition comprising a chloroplatinous tert.-heptylmercaptide-tetrahydrothiophene complex, an organic decorating vehicle and a flux.

13. A decorating composition comprising a halogenoplatinous mercaptide-alkyl sulfide complex and a liquid bright gold.

14. A decorating composition comprising a chloroplatinous n-octylmercaptide-ethyl sulfide complex and a liquid bright gold.

15. A decorating composition comprising a chloroplatinous tert.-heptylmercaptide-methyl sulfide complex and a liquid bright gold.

16. A decorating composition comprising a chloroplatinous tert.-heptylmercaptide-ethyl sulfide complex and a liquid bright gold.

17. A decorating composition comprising a chloroplatinous tert.-heptylmercaptide-butyl sulfide complex and a liquid bright gold.

18. A decorating composition comprising a chloroplatinous tert.-heptylmercaptide-tetrahydrothiophene complex and a liquid bright gold.

19. A decorating composition comprising a halogenoplatinous mercaptide-alkyl sulfide complex and a burnish gold.

20. A decorating composition comprising a chloroplatinous n-octylmercaptide-ethyl sulfide complex and a burnish gold.

21. A decorating composition comprising a chloroplatinous tert.-heptylmercaptide-methyl sulfide complex and a burnish gold.

22. A decorating composition comprising a chloroplatinous tert.-heptylmercaptide-ethyl sulfide complex and a burnish gold.

23. A decorating composition comprising a chloroplatinous tert.-heptylmercaptide-butyl sulfide complex and a burnish gold.

24. A decorating composition comprising a chloroplatinous tert.-heptylmercaptide-tetrahydrothiophene complex and a burnish gold.

25. A compound having the formula

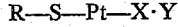

R—S—Pt—X·Y in which R is selected from the group consisting of alkyl, substituted alkyl, aralkyl and terpenyl radicals, X is halogen, and Y is selected from the group consisting of alkyl sulfides, substituted alkyl sulfides and heterocyclic sulfides containing a —$CH_2SCH_2$— linkage in the ring, the compound containing at least seven carbon atoms.

26. A compound according to claim 25 in which X is chlorine.

27. A chloroplatinous tert.-hexylmercaptide-methyl sulfide complex.

28. A chloroplatinous tert.-heptylmercaptide-methyl sulfide complex.

29. A chloroplatinous tert.-heptylmercaptide-ethyl sulfide complex.

30. A chloroplatinous tert.-heptylmercaptide-ethylmercaptoethanol complex.

31. A chloroplatinous tert.-heptylmercaptide-butylethyl sulfide complex.

32. A chloroplatinous tert.-heptylmercaptide-butyl sulfide complex.

33. A chloroplatinous tert.-heptylmercaptide-tetrahydrothiophene complex.

34. Chloroplatinous n-dodecylmercaptide-methyl sulfide complex.

35. A chloroplatinous tert.-dodecylmercaptide-methyl sulfide complex.

36. Chloroplatinous isooctyloxycarbonylmethyl-mercaptide-methyl sulfide complex.

37. Chloroplatinous α-methylbenzylmercaptide-ethyl sulfide complex.

38. Chloroplatinous pinenemercaptide-methyl sulfide complex.

39. Chloroplatinous methylmercaptide-propyl sulfide complex.

40. Chloroplatinous ethylmercaptide-propyl sulfide complex.

41. Chloroplatinous ethylmercaptide-methyl butyl sulfide complex.

42. Chloroplatinous n-propylmercaptide-ethyl sulfide complex.

43. Chloroplatinous n-propylmercaptide-methyl butyl sulfide complex.

44. Chloroplatinous isopropylmercaptide-ethyl sulfide complex.

45. Chloroplatinous n-butylmercaptide-ethyl sulfide complex.

46. Chloroplatinous isobutylmercaptide-ethyl sulfide complex.

47. Chloroplatinous sec.-butylmercaptide-ethyl sulfide complex.

48. Chloroplatinous tert.-butylmercaptide-ethyl sulfide complex.

49. Chloroplatinous n-amylmercaptide-methyl sulfide complex.

50. Chloroplatinous n-amylmercaptide-ethyl sulfide complex.

51. Chloroplatinous isoamylmercaptide-methyl sulfide complex.

52. Chloroplatinous isoamylmercaptide-ethyl sulfide complex.

53. Chloroplatinous n-hexylmercaptide-ethyl sulfide complex.

54. Chloroplatinous tert.-amylmercaptide-methyl sulfide complex.

55. Chloroplatinous n-octylmercaptide-methyl sulfide complex.

56. Chloroplatinous n-octylmercaptide-ethyl sulfide complex.

57. Chloroplatinous n-octylmercaptide-tetrahydrothiophene complex.

58. Chloroplatinous ethylmercaptide-butyl sulfide complex.

References Cited in the file of this patent

UNITED STATES PATENTS 2,733,167    Stockey _____ Jan. 31, 1956

FOREIGN PATENTS 546,067    Canada _____ Sept. 10, 1957